US006402393B1

(12) United States Patent
Grimes et al.

(10) Patent No.: US 6,402,393 B1
(45) Date of Patent: Jun. 11, 2002

(54) INTERCONNECTION SYSTEM FOR OPTICAL CIRCUIT BOARDS

(75) Inventors: Gary J. Grimes, Birmingham, AL (US); Norman Roger Lampert, Norcross, GA (US); Charles J. Sherman, Westminster, CO (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/515,998

(22) Filed: Feb. 29, 2000

(51) Int. Cl.[7] .............................. G02B 6/36; G02B 6/38
(52) U.S. Cl. ............................ 385/89; 385/56; 385/60; 385/71; 385/72
(58) Field of Search ....................... 385/14, 75, 88–90, 385/55, 56, 59, 60, 70–72

(56) References Cited

U.S. PATENT DOCUMENTS

| 4,547,039 A | * | 10/1985 | Caron et al. .................. 385/88 |
| 5,394,503 A | | 2/1995 | Dietz, Jr. et al. ............ 385/135 |
| 5,469,526 A | * | 11/1995 | Rawlings ...................... 385/135 |
| 5,528,711 A | * | 6/1996 | Iwano et al. ................... 385/56 |
| 5,563,978 A | | 10/1996 | Kawahara et al. .......... 385/136 |
| 5,647,043 A | | 7/1997 | Anderson et al. ............. 835/78 |
| 5,719,977 A | | 2/1998 | Lampert et al. ............... 385/60 |
| 6,264,481 B1 | * | 7/2001 | Kozel et al. ................... 439/92 |

FOREIGN PATENT DOCUMENTS

| EP | 0330231 | 8/1989 |
| JP | 58083809 | 5/1983 |
| JP | 0928978 | 7/1999 |

OTHER PUBLICATIONS

"Journal of Lightwave Technology", vol. 10, No. 10, pp. 1,356–1,362, Iwano, S. et al., "Compact and Self–Retentive Multi–Ferrule Optical Backpanel Connector".*

Nagase, R, et al., "Design For Mu–Type Single–Mode Miniature Optical Connector," IEICE TransactionsOn Electronics, JP, Institute of Electronics Information and Comm. Eng. Tokyo, vol. E81–C, No. 3,Mar. 1, 1998, pp. 408–415.

Shin'ichi Iwano, et al., "Compact and Self–Retentive Multi–Ferrule Optical Backpanel Connector," Journal of Lightwave Technology, US, IEEE, New York, vol. 10, No. 10, Oct. 1, 1992, pp. 1356–1362.

* cited by examiner

Primary Examiner—Hemang Sanghavi
Assistant Examiner—Omar Rojas, Jr.
(74) Attorney, Agent, or Firm—Barry H. Freedman

(57) ABSTRACT

An interconnection system is shown that enables an optical circuit board 300, having a number of optical devices 400, 500, to be easily connected to and disconnected from a backplane 100. The optical devices are positioned along a side edge 311 of a printed wiring board 310 and are adapted to interconnect with a like number of optical connectors 200 that are arrayed on the backplane in a row or column. Each optical plug is held in a holder 120, which is retained in backplane 100 by a clip 110. Each of the optical connectors is a plug that includes a ferrule 24, which encloses an optical fiber and projects from one end of the plug. Each of the edge-mounted optical devices includes a jack receptacle 410, 510 at its front end and has a cavity 401, 501 that is shaped to receive the optical plug. All of the jack receptacles are similarly shaped. Each cavity further includes a boss 421, 521 for receiving the ferrule. The plugs and jack receptacles are arranged to engage, but not interlock with, each other. The optical devices include two or more downward-extending pins 430, 530 that are received in corresponding holes 334, 335 in the printed wiring board for accurate positioning. Illustratively, optical device 400 includes a jack receptacle in its front-end portion 410 and its back-end portion 420; whereas optical device 500 includes a jack receptacle in its front-end portion 510 and one or more transducers 550, for converting between electrical and optical signals, in its back-end portion 520.

12 Claims, 5 Drawing Sheets

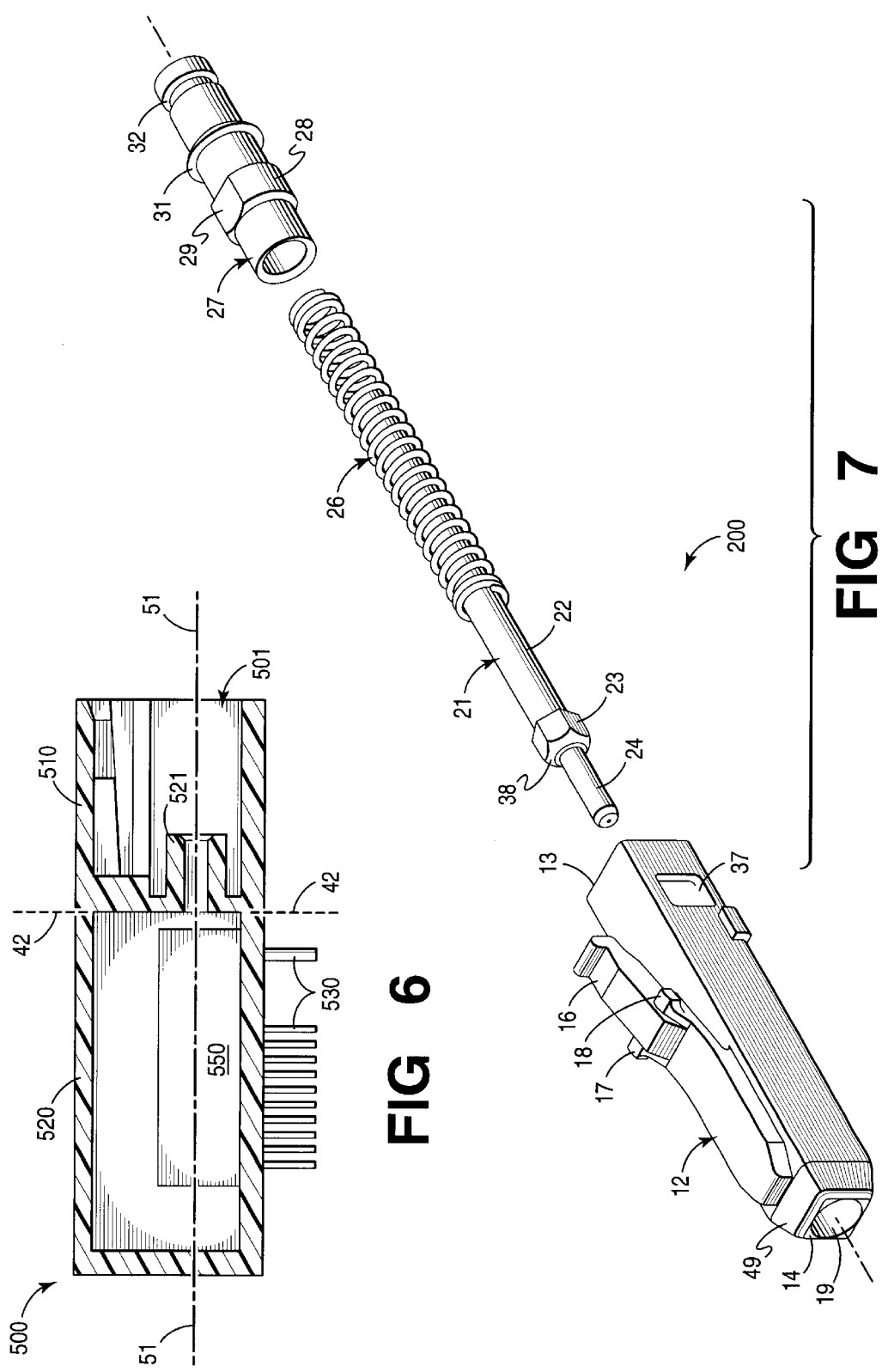

INTERCONNECTION SYSTEM FOR OPTICAL CIRCUIT BOARDS

RELATED APPLICATIONS

This application is related to U.S. patent application Ser. No. 09/515,976, and Ser. No. 09/515,291, now U.S. Pat. No. 6,318,903, both filed concurrently herewith.

TECHNICAL FIELD

This invention relates to system for interconnecting optical circuit boards with optical connectors, which are arrayed (row or column) on a mounting panel.

BACKGROUND OF THE INVENTION

For a variety of reasons, modern communication equipment is now being designed to process data at progressively higher speeds. Perhaps the most significant reason relates to the desire to transfer video information between computers. Such data transfer has grown exponentially in recent years because of the Internet, and no decrease in growth is anticipated in the foreseeable future. In order to handle this growth, only optical circuitry appears capable of meeting the demand because of the enormous bandwidth that an optical fiber can provide. Nevertheless, distribution equipment is still needed to route optical signals to the same locations, and this means that optical connecting hardware needs to be sufficiently small to accommodate large numbers of individual fiber connections.

One particular location where congestion occurs is on circuit boards that contain optical components (i.e., optical circuit boards) where individual input/output ports must be provided to make connections on a per-fiber basis. Moreover, it is desirable to plug these circuit boards into a panel, or backplane, that accommodates a number of other circuit boards similar to the way electrical circuit boards are mounted in an equipment bay. However, electrical circuit boards can tolerate substantial displacement in the X, Y and Z directions while still providing reliable electrical connections, but optical circuit boards cannot. (It is noted that the X, Y and Z directions are mutually orthogonal, and that the Z direction coincides with the general direction of signal flow through the connection). Indeed, the primary vehicle for optical connection is the "butt" connector where the end face of one fiber is pressed against the end face of another fiber. In such a connection, there should be no air gap between the fiber end faces and there should be no fiber displacement in the X and Y directions—otherwise there would be too much signal loss. (It is noted that a singlemode optical fiber has a light-carrying region that is only about 8 microns ($\mu$m) in diameter, and that it must be precisely aligned in an axial direction with another fiber.) It is therefore a challenging task to provide a number of optical devices on a plug-in optical circuit board that accurately mate with a corresponding number of stationary optical connectors.

Optical devices are known that might be adapted to mount on an optical circuit board, but their construction is relatively complex and/or their attachment to an optical circuit board requires expensive and time-consuming manual labor. More importantly, there is a need to standardize the optical interface for plug-in optical circuit boards. The interface should provide accurate optical alignment and be suitable for high density interconnections.

SUMMARY OF THE INVENTION

The present invention is for an interconnection system that enables an optical circuit board, having a number of optical devices, to be easily connected to and disconnected from a backplane. The optical devices are positioned along a side edge of a generally planar surface of the circuit board and are adapted to interconnect with a like number of optical plugs that are arrayed on the backplane in a row or column. Each of the plugs includes a ferrule having an end face that projects from a connector end of the plug. The front-end portion of each optical device is a jack receptacle that includes: (i) a cavity having a generally rectangular opening for receiving the optical plug, (ii) a boss that extends into the cavity for receiving the ferrule, and (iii) an optical plane where the end face of the ferrule resides when installed within the boss. All of the jack receptacles are positioned on the circuit board such that their individual optical planes are substantially coincident with each other and are parallel to the side edge of the circuit board. The optical plugs and jack receptacles are arranged to engage, but not interlock with, each other.

In an illustrative embodiment of the invention, the ferrules are cylindrical and enclose a single optical fiber. Additionally, the jack receptacles are molded from a plastic material as a single part and include two or more downward-extending pins that are received in corresponding holes in the circuit board for accurate positioning. Accurate positioning is important because plug-in circuit boards make "blind" connections, which is to say that the installer is generally unable to see the connection being made during installation and is, therefore, unable to make minor positional adjustments to facilitate connection.

In one illustrative embodiment of the invention, the back-end portion of the edge-mounted optical device also includes a jack receptacle and thus forms a coupling device for interconnecting a pair of optical plugs. Alternatively, the back-end portion of the optical device may include one or more transducers for converting optical signals into electrical signals and/or electrical signals into optical signals.

Plug-in circuit boards that house optical components will soon be as familiar as circuit boards that house electrical components. The plug-in concept has been widely accepted because such circuit boards provide a large and manageable amount of hardware on an easily replaceable device. Circuit boards frequently include diagnostic hardware and software that can alert service personnel when a board is not working properly. And because a defective board can be quickly replaced by pulling out one circuit board and plugging in another, maintenance is facilitated and downtime is minimal. This is particularly useful in large and complex systems where removal of a single board affects a large number of customers. The convenience of plug-in circuit boards is largely attributable to the fact that all connections between the board and a backplane can be non-destructively severed by merely pulling the circuit board from the slot where it operatively resides. By "backplane" is meant, generally, a wall that separates internal apparatus from external apparatus, and through which a connection(s) is made.

In the present invention, the backplane comprises a mounting panel with optical plugs installed in one side and optical circuit boards installed in the other. In particular, the optical circuit boards only use jack receptacles affixed to the edge of the circuit board for making connection to the backplane, which contains an array (row or column) of optical plugs. Unlike prior art interconnection systems, a transceiver device can now be edge mounted on the optical circuit board with its jack receptacle positioned to receive an optical plug, thereby eliminating the need for additional optical jumpers and adapters on the circuit board. And whereas known optical plugs and jack receptacles individually interlock when connected, the present invention avoids individual interlocking of the optical plugs and jacks to facilitate removal of the optical circuit boards from the backplane.

BRIEF DESCRIPTION OF THE DRAWINGS

The invention and its mode of operation will be more clearly understood from the following detailed description when read with the appended drawing in which:

FIG. 6 is a cross-section view of an optical transceiver; and

FIG. 7 is an exploded perspective view of an elongated optical plug showing its basic elements.

DETAILED DESCRIPTION

Figure 1:
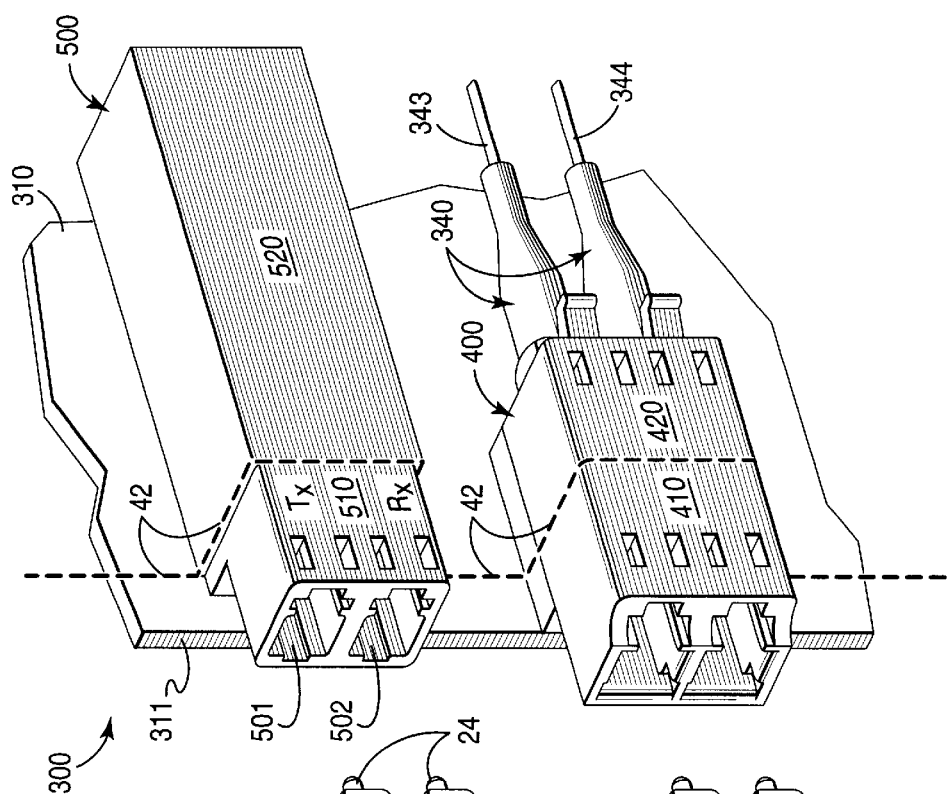
FIG. 1 discloses a top-side perspective view of an optical circuit board having jack receptacles about to be connected to an array of optical plugs that are mounted on a backplane in accordance with the invention.
Figure 1:
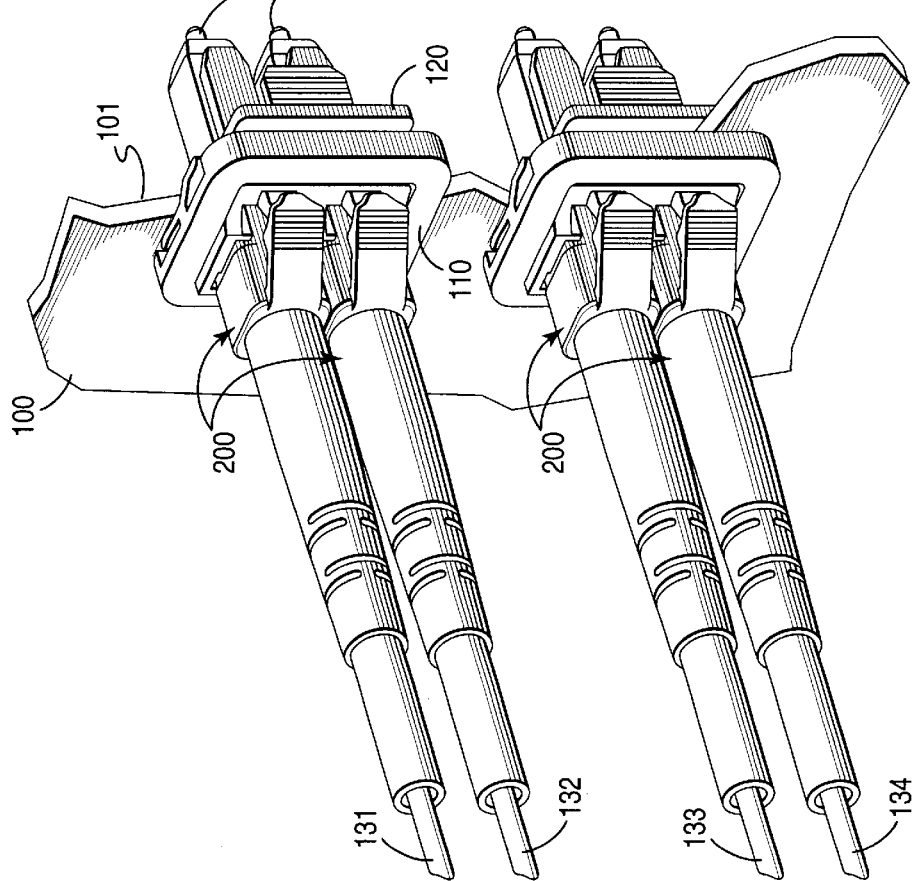
Figure 2:
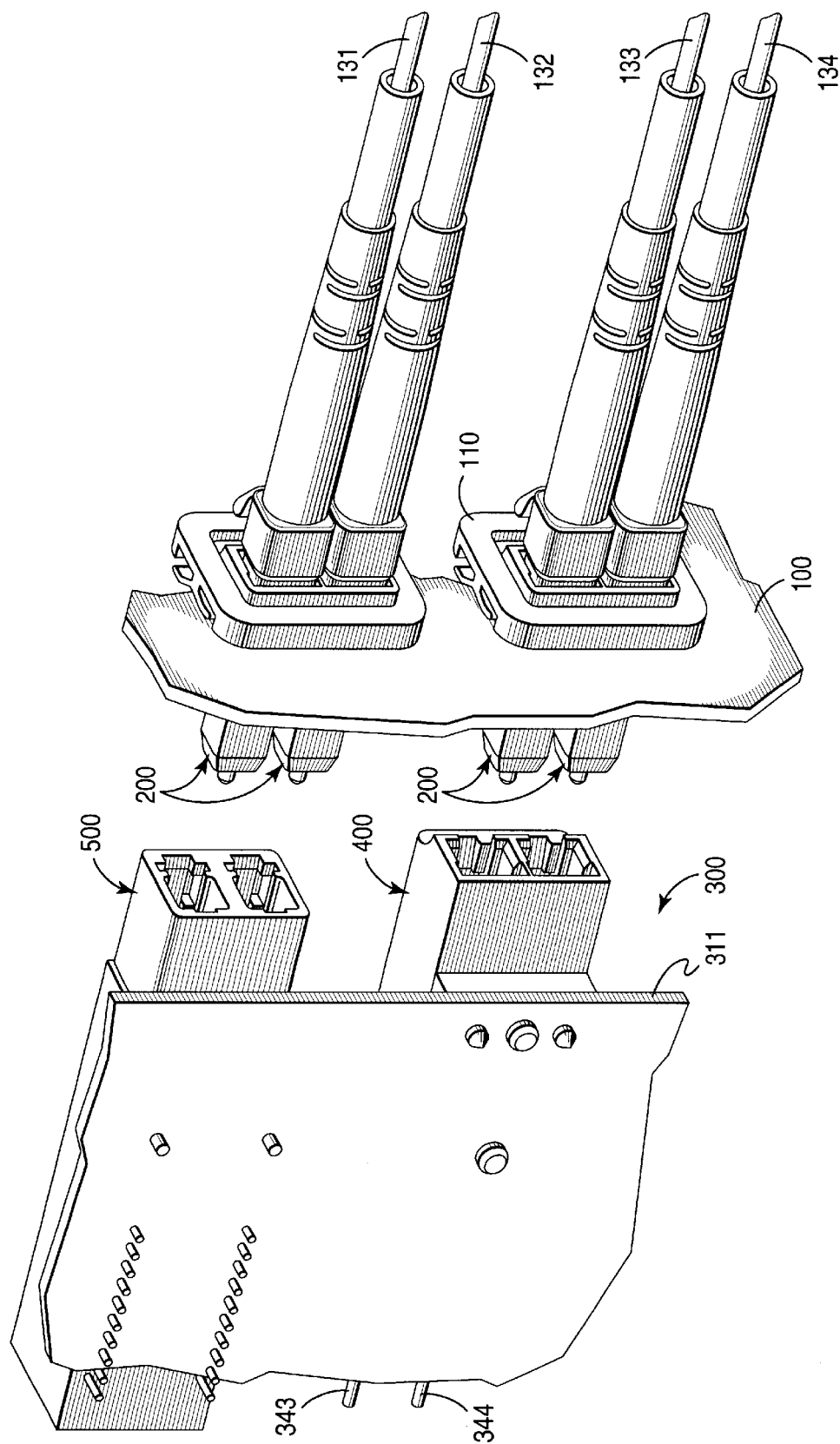
FIG. 2 discloses a bottom-side perspective view of the optical circuit board and optical plug array shown in FIG. 1.

FIG. 1 and FIG. 2 respectively show top-side and bottom-side perspective views of an optical circuit board 300 having optical devices 400, 500 about to be connected to an array of optical connectors 200 that are attached to a mounting panel 100 (generally referred to as a backplane) in accordance with the invention. In particular, the optical devices 400, 500 are mounted on a substrate 310, which is frequently referred to as a printed wiring board (PWB). Because these devices are mounted along a side edge 311 of the substrate 310, they are referred to as edge-mounted devices. In the present invention, all of the optical connectors comprise optical plugs 200, which are inserted into a holder 120 that attaches to the backplane 100 by means of a clip 110. The clip 110 and the holder 120 are designed to provide the optical plug with a small but limited amount of travel in the X and Y directions so that the plug 200 can accommodate positional variations of the optical devices 400, 500 that are attributable, for example, to an accumulation of manufacturing tolerances on circuit board 300. The construction of the clip 110 and the holder 120 is detailed in concurrently filed U.S. patent application Ser. No. 09/515,976 (Lampert 42), which is hereby incorporated by reference. The optical plugs 200 interlock with the holder 120, but do not interlock with the optical devices 400, 500 on the optical circuit board 300. The circuit board 300 is typically contained in a circuit pack and is mounted on a shelf (not shown) using card guides. The circuit pack is plugged into the shelf and is typically held in place with a latch on its faceplate, which is mounted to a side edge of the PWB 310 that is opposite side edge 311. The latch on the faceplate is designed to overcome the cumulative spring forces of the optical plugs 200 on backplane 100.

Illustratively, each optical plug 200 terminates a single optical fiber that is contained in each of optical cables 131–134, although connectors containing multiple optical fibers are contemplated within the scope of the present invention. Each optical fiber extends through a bore in the optical plug 200 and is held within a cylindrical ferrule 24 that protrudes through the connector end 14 of the plug 200 (see FIG. 7).

Optical device 500 comprises a front-end portion 510, which is a jack receptacle, and a back-end portion 520, which contains transducers. Optical signals are delivered to optical cable 131 via transmit ($T_x$) port 501, and optical signals are received from optical cable 132 via receive ($R_x$) port 502. Optical-to-electrical conversion is performed by a photodiode in the back-end portion 520 of the device 500 that responds to input optical signals on the $R_x$ port 502. Electrical-to-optical conversion is performed by a semiconductor laser in the back-end portion 520 of the device 500 that provides output optical signals on the $T_x$ port 501.

Optical device 400 comprises a front-end portion 410, which is a jack receptacle, and a back-end portion 420, which is also a jack receptacle. Advantageously, the front-end portion 410 of optical device 400 is substantially identical to the front-end portion 510 of optical device 500. This allows identical optical plugs 200 to be used with either device, which is extremely important to designers of such equipment since it simplifies board layout and facilitates design changes, and allows for connections to new, unforeseen PWB-mounted optical devices using jack receptacles. Device 400 is an adapter for connecting a possibly different style of optical plug 340 to optical plug 200. Whether the optical plugs are similar or not, the goal to interconnect optical fibers 133, 134 with optical fibers 343, 344 respectively.

Optical devices 400 and 500 each include a jack receptacle having an associated optical plane 42 where the end face of an optical plug 200 will terminate when it is installed into the jack receptacle. It is important that the optical planes 42 of all jack receptacles be coincident with each other. Moreover, the optical plane 42 must be parallel to the side edge 311 of the circuit board so that all optical plugs 200 can be arranged to protrude from the mechanical reference plane 101 on the front surface of backplane 100 by the same predetermined distance—irrespective of whether the optical device on the associated circuit board is an adapter 400, a transceiver 500 or other kind of device.

Figure 3:
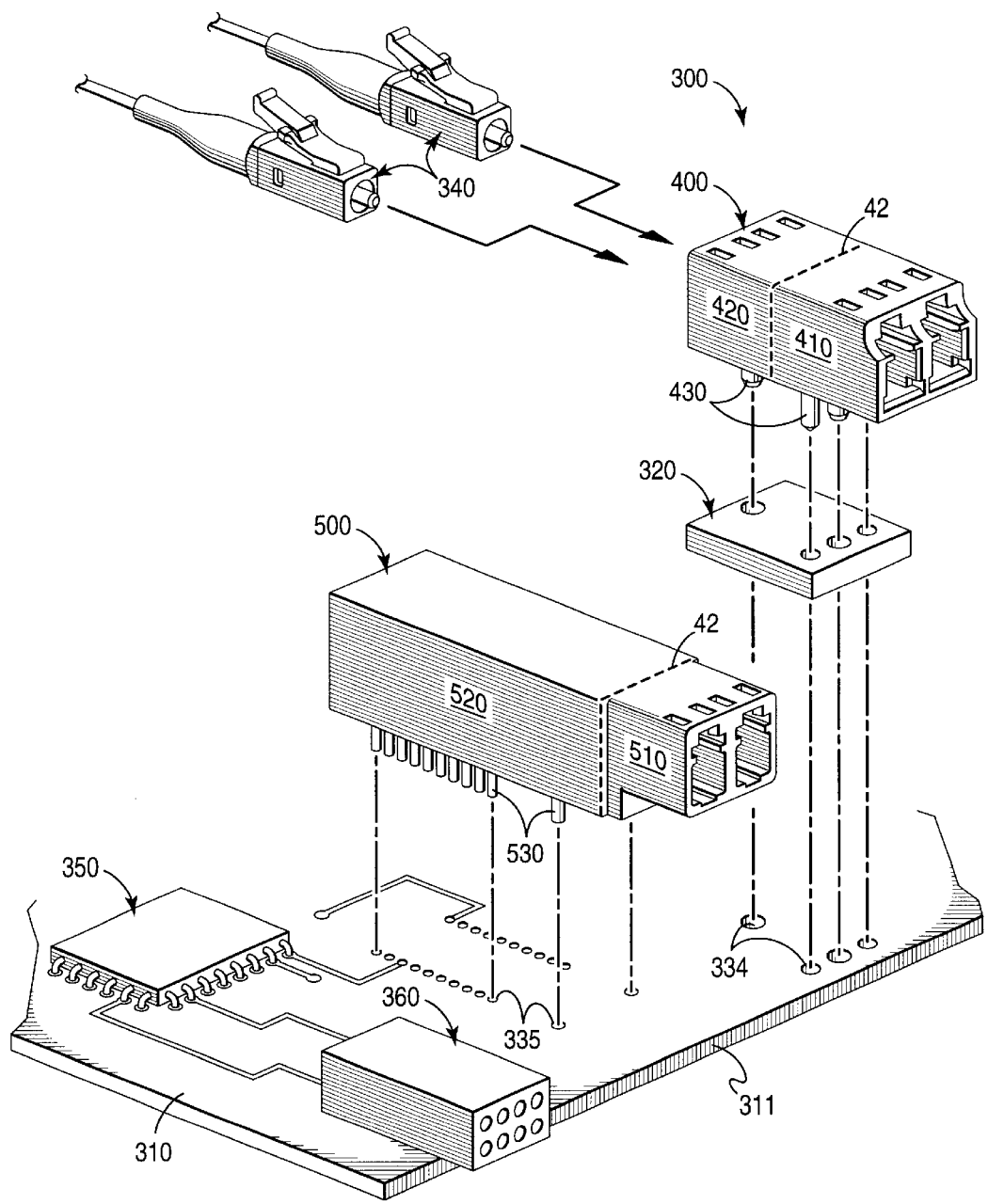
FIG. 3 shows an exploded perspective view of a circuit board having edge-mounted optical jack receptacles in accordance with the invention.

FIG. 3 shows an exploded perspective view of circuit board 300 in greater detail. Printed wiring board 310 illustratively includes an integrated circuit 350 that processes electrical signals and exchanges same with an edge-mounted electrical connector 360 and with optical device 500 which, as discussed hereinabove, provides conversion between electrical and optical signals in its back-end portion 520 and interconnection with optical plugs in its front-end portion 510. Positioning of the optical devices 400, 500 along edge 311 is accomplished via downward-extending pins 430 and 530 which are installed into corresponding holes 334 and 335 in the printed wiring board 310. At least two such pins are used by each device to achieve acceptable accuracy. Note that optical circuit board 300 comprises female receptacles that are normally "blind" connected to male plugs without the installer having the benefit of being able to see and guide the interconnection. Accordingly, accuracy in the positioning of the optical devices 400, 500 on the printed wiring board 310 is important.

As indicated in FIG. 3, it is frequently desirable, although not necessary, to include different kinds of optical devices 400, 500 on the same optical circuit board. In the example embodiment of FIG. 3, optical device 500 is taller than optical device 400. In order to position all front end optical receptacles 410 and 510 at the same height, a standoff block 320 may be provided to change the height of one of the receptacles. Here, device 400 is raised. FIG. 3 also illustrates that the back-end portion 420 of optical device 400 includes a jack receptacle that accommodates a different style of optical plug 340 Such plugs are disclosed in U.S. Pat. No. 5,719,977.

Figure 4:
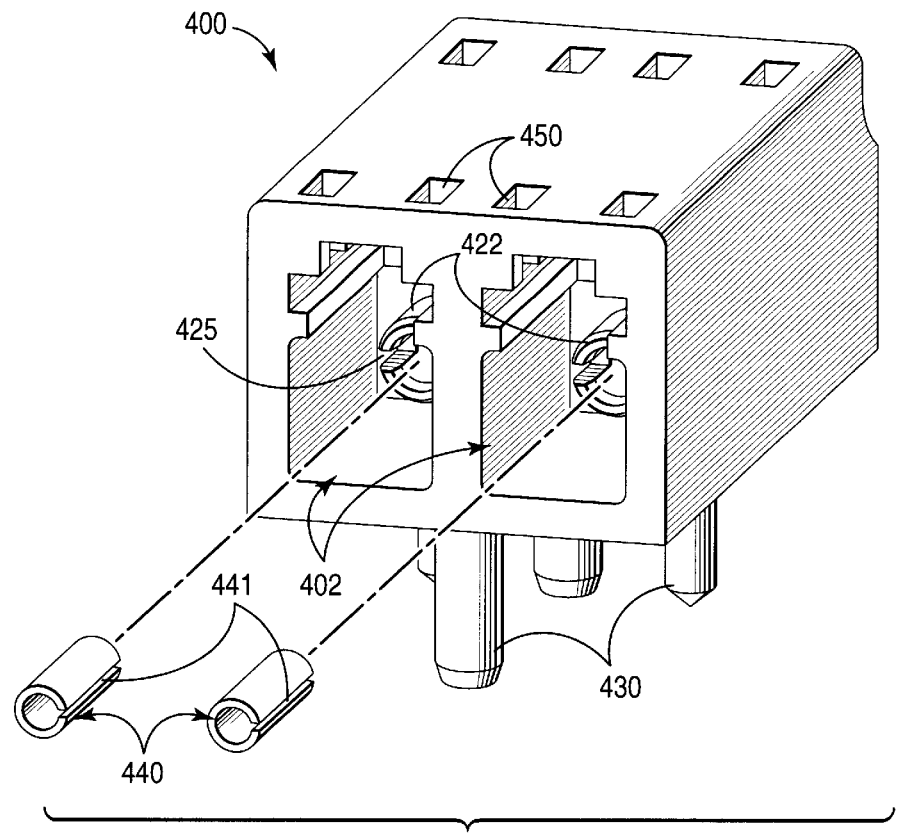
FIG. 4 shows a perspective view of an optical adapter.
Figure 5:
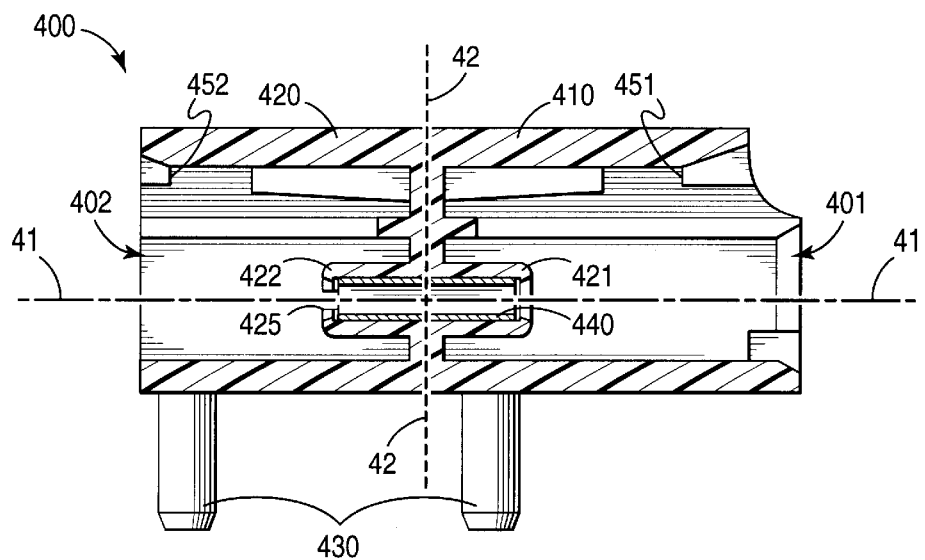
FIG. 5 is a cross-section view of the optical adapter shown in FIG. 4.

Although optical device 400 includes front-end 410 and back-end 420 portions, both of which comprise jack receptacles, it is molded as a single part as shown in FIG. 4 and FIG. 5. The front end 410 and back-end 420 portions are separated at the optical plane 42—42 where the ferrules of optical plugs 200, 340 meet (see FIG. 1 and FIG. 2). Each jack receptacle includes a cavity 401, 402 having a generally rectangular opening that is shaped to receive an optical plug such as the LC type discussed above and shown in FIG. 7. A common longitudinal axis 41—41 extends through cavities 401, 402, which are positioned back-to-back with bosses 421, 422 projecting into each cavity. Illustratively, the boss 422 within cavity 402 includes a flexible bifurcation 425 that enables an alignment sleeve 440 to be installed without damage to the boss 422. The alignment sleeve 440 includes a slit 441 along its length so that it can be made with a slightly smaller diameter than the ferrules it will ultimately surround and hold in axial alignment. Bosses 421, 422 surround and capture the alignment sleeve 440, which extends through the optical plane 42 where the end faces of a pair of optical plugs touch each other. Moreover, the alignment sleeve 440 has a central axis that is collinear with the longitudinal axis 41—41 that extends between pairs of back-to-back cavities. Although specifically not used in the present invention, each cavity further includes internal latching surfaces 451, 452 for interlocking with lugs on a latching arm of a conventional LC-type connector. Such internal latching surfaces are formed during the molding process by a tool that creates and extends through holes 450 in the top surface of the device 400. Alternatively, such holes might also be located on the side surfaces of the device 400 for the same purpose. The cost of this device 400 is significantly reduced over known similar structures such as the one shown in U.S. Pat. No. 5,647,043, by molding it as a single part, using a suitable plastic material, and by forming the downward-extending pins 430 during molding.

Reference is now made to FIG. 6 for a cross-section view of optical device 500, which includes front-end portion 510 and back-end portion 520 that are separated at the optical plane 42—42 where the end face of a ferrule of an optical plug installed within cavity 501 effectively resides. The jack receptacle portion 510 of device 500 includes a cavity 501 having a generally rectangular opening that is shaped to receive an optical plug such as the LC type. A longitudinal axis 51—51 extends through cavity 501 and boss 521, which supports the ferrule of the optical plug. The central axis of the boss 521 is collinear with the longitudinal axis 51—51. Illustratively, an electrical-to-optical transducer 550, such as a semiconductor laser, is mounted in the back-end portion 520 of the optical device 500. It is positioned to emit light substantially along the central axis 51—51. Because bi-directional optical transmission is desirable, optical device 500 generally comprises a pair of side-by-side receptacles: one for transmitting optical signals and the other for receiving optical signals. Accurate positioning of the device 500 on an optical circuit board is facilitated by the presence of two or more downward-extending pins 530 that fit into mating holes in the optical circuit board as discussed above. Accurate positioning is important because the optical planes 42 of all edge-mounted optical devices 400, 500 must coincide with each other and be parallel to the side edge 311 of circuit board 300 (see FIG. 1).

FIG. 7 is an exploded perspective view of an LC plug connector (optical plug) 200, which is useful in the present invention. The optical plug 200 comprises a unitary housing 12, which has a length from the cable entrance end 13 to the connector end 14 that is sufficient to make the plug 200 usable over a wide range of backplane thicknesses. As such, the plug 200 is considerably longer than the standard LC connector. A latching arm 16, having first and second latching lugs 17, 18 extends from housing 12, for latching the plug 200 within the holder 120 (see FIG. 1). In addition to the holder 120 and its associated clip 110 being capable of a limited amount travel in the X and Y directions, which are perpendicular to a longitudinal axis of plug 200, the connector end 14 of the housing 12 includes a chamfer 49 that provides further assistance mating the plug 200 to the associated optical device on circuit board 300. Furthermore, plug 200 is fixed in the Z direction, by holder 120, to the same mechanical reference plane 101 on the front surface of backplane 100—regardless of backplane thickness.

Housing 12 and latching arm 16 are made from a suitable plastic material such as polyetherimide, and are preferably molded as a one-piece structure. The plastic material should have sufficient resilience to allow the latching arm 16 to be depressed and to spring back to its non-depress (latching) position, thereby forming a "living" hinge. It is noted that optical plug 200 latches to holder 120, which is installed on backplane 100, and not to any of the edge-mounted devices 400, 500 on the optical circuit board 300 (see FIG. 1). This allows the circuit board to be easily installed or removed from the backplane 100. Housing 12 has an axial bore 19 extending therethrough that accommodates a ferrule-barrel assembly 21. Assembly 21 comprises a hollow tubular member 22 having an enlarged flange 23 on the barrel member from which extends a ferrule 24, which may be of a suitably hard and wear-resistant material such as ceramic, glass or metal and which functions to contain an optical fiber therein. A coil spring 26 surrounds tubular member 22 and seats against the rear of flange 23 at its forward end, and against an insert 27 at its rear end. Insert 27 is tubular and accommodates tubular member 22.

Insert 27 includes an enlarged-diameter section 28 having first and second flats 29 (only one is shown) thereon that cooperate with corresponding flat surfaces (not shown) within the cable entrance end 13 of the housing 12 to prevent rotation. Insert 27 also has a flange 31, which functions as a stop to prevent the insert 27 from being inserted too far into the housing 12.

At the cable-receiving end of insert 27 is a groove 32, which is designed to receive fibrous strength members, usually aramid fibers, which are affixed thereto by means of a crimping member, thereby anchoring an incoming fiber cable to the plug 200. Each of the sidewalls of housing 12 (only one is shown) has an opening 37 therein for receiving the enlarged diameter portion 28 of insert 27 and which functions to affix the insert 27 longitudinally, i.e., in the Z direction within the housing 12.

The front end of flange 23 has a polygonal shape, preferably hexagonal, with a slope 38 that is adapted to seat in a corresponding shaped sloped recess portion of the bore 19 which provide six positions for tuning the optical plug 200. Additional detail regarding the design of the optical plug 200 is contained in concurrently filed U.S. patent application Ser. No. 09/515,291 (Andrews 6-7-43-4-5-10), which is hereby incorporated by reference.

Although various particular embodiments of the present invention have been shown and described, modifications are possible within the scope of the invention. In particular, it is noted that whereas the present invention precludes individual interlocking of the optical plugs and jack receptacles by using an elongated plug whose latching arm does not enter the jack receptacle, this could also be accomplished by designing a jack receptacle that does not include a retaining surface for the latching arm. Other modifications include, but are not limited to the use of optical plugs and jack receptacles that accommodate more than a single optical fiber, and the use of optical devices having more (or less) than two jack receptacles.

What is claimed is:

1. An interconnection system for optical circuit boards comprising a plug-in circuit board having a plurality of optical devices, which are positioned along a side edge of the board, each optical device including a front-end portion for receiving an optical connector, said system further comprising a backplane having a linear array of optical connectors mounted thereon CHARACTERIZED IN THAT each optical connector comprises an optical plug housing having a ferrule disposed therein, said ferrule having an optical fiber disposed along its longitudinal axis and an end face that projects from one end of the housing; and the front-end portions of all of the edge-mounted optical devises comprise similarly shaped jack receptacles, each jack receptacle including: (i) a front cavity having a generally rectangular opening for receiving the optical plug, (ii) a first boss that extends into the front cavity for receiving the furrule, and (iii) an optical plane where the end face of the ferrule resides when installed within the boss, all of said jack receptacles being positioned on the circuit board such that their individual optical planes are substantially coincident with each other and are parallel to the side edge of the circuit board wherein at least one of the edge-mounted optical devices comprises a housing with front and back ends and a bottom side, said housing including at least two pins that extend downward from the bottom side to engage corresponding holes in the circuit board for accurately positioning the edge-mounted optical device thereon.

2. The interconnection system of claim 1 wherein the housing comprises a pair of side-by-side jack receptacles at the front end and a pair of side-by-side jack receptacles at the back end, each jack receptacle at the back end including a back cavity having a generally rectangular opening for receiving a second optical plug and having a second boss that extends into the back cavity, said front and back cavities being coaxially aligned with each other, said first and second bosses being coaxially aligned to provide an opening between the front and back cavities.

3. The interconnection system of claim 2 wherein the first and second bosses enclose an alignment sleeve.

4. The interconnection system of claim 3 wherein one of the bosses includes a flexible bifurcation that facilitates installation of the alignment sleeve therein.

5. The interconnection system of claim 1 wherein the housing comprises a one-piece, molded plastic structure.

6. The interconnection system of claim 1 wherein the housing includes a pair of side-by-side jack receptacles at the front end and a pair of side-by-side optical transducers at the back end, one of said transducers providing electrical-to-optical conversion and the other of said transducers providing optical-to-electrical conversion.

7. An optical circuit board comprising a plurality of optical devices with front and back ends, each optical device being positioned along a side edge of the board and including a jack receptacle at its front end having: (i) a front cavity with an opening that is shaped to receive a first optical plug and an associated ferrule, (ii) a first boss that extends into the front cavity for receiving the ferrule, and (iii) an optical plane where the end face of the ferrule resides when installed within the boss, all of said jack receptacles being positioned on the circuit board such that their individual optical planes are substantially coincident with each other and are parallel to the side edge of the circuit board, each optical device having at least two pins that extend downward from a bottom side thereof for accurately positioning the device on the circuit board.

8. The optical circuit board of claim 7 wherein at least one of the optical devices further includes a jack receptacle at its back end having: (i) a back cavity with an opening that is shaped to receive a second optical plug with a second ferrule, (ii) a second boss that extends into the back cavity for receiving the second ferrule, and (iii) the optical plane where an end faces of the first and second ferrules touch each other when installed in the first and second bosses respectively.

9. The optical circuit board of claim 8 wherein the first and second bosses are coaxially aligned to provide an opening between the front and back cavities and to surround an alignment sleeve, at least one of the bosses including a flexible bifurcation that enables the alignment sleeve to be installed therein without breaking.

10. The optical circuit board of claim 7 wherein at least one of the optical devices further includes an optical transmitter at its back end, said transmitter comprising a semiconductor laser.

11. The optical circuit board of claim 7 wherein at least one of the optical devices further includes an optical receiver at its back end, said receiver comprising a photodiode.

12. The optical circuit board of claim 7 wherein the front end of at least one of the optical devices includes a pair of side-by-side jack receptacles, and the back end includes an optical transceiver, said transceiver comprising an optical transmitter and an optical receiver, said transmitter being positioned to transmit optical signals into one of the jack receptacles and the receiver being positioned to receive optical signals from the other jack receptacle.

* * * * *